US012374844B2

(12) United States Patent
Liu et al.

(10) Patent No.: US 12,374,844 B2
(45) Date of Patent: Jul. 29, 2025

(54) ELECTRONIC CONNECTOR

(71) Applicants: Tyco Electronics (Shanghai) Co. Ltd., Shanghai (CN); TE Connectivity Germany GmbH, Bensheim (DE)

(72) Inventors: Jiaoyong (Mac) Liu, Shanghai (CN); Hongqiang (Sean) Han, Shanghai (CN); Jie (Roger) Luo, Shunde (CN); Frank Keutz, Bensheim (DE)

(73) Assignees: Tyco Electronics (Shanghai) Co., Ltd., Shanghai (CN); TE Connectivity Germany GmbH, Bensheim (DE)

( * ) Notice: Subject to any disclaimer, the term of this patent is extended or adjusted under 35 U.S.C. 154(b) by 380 days.

(21) Appl. No.: 17/900,156

(22) Filed: Aug. 31, 2022

(65) Prior Publication Data

US 2023/0061213 A1 Mar. 2, 2023

(30) Foreign Application Priority Data

Aug. 31, 2021 (CN) ......................... 202111018654.3

(51) Int. Cl.
*H01R 25/14* (2006.01)
*H01R 13/24* (2006.01)
*H01R 13/629* (2006.01)

(52) U.S. Cl.
CPC ............. *H01R 25/14* (2013.01); *H01R 13/24* (2013.01); *H01R 13/629* (2013.01)

(58) Field of Classification Search
CPC ...... H01R 25/14; H01R 13/24; H01R 13/629; H01R 13/6315; H01R 12/57; H01R 23/7068; H01R 23/725
USPC ................................ 439/110, 246, 251, 637
See application file for complete search history.

(56) References Cited

U.S. PATENT DOCUMENTS

| | | | | | |
|---|---|---|---|---|---|
| 3,040,291 | A * | 6/1962 | Schweitzer | H01R 4/10 | D13/133 |
| 3,120,988 | A * | 2/1964 | Gilbart | H01R 13/26 | 439/747 |
| 3,989,344 | A * | 11/1976 | Pechard | H01R 12/721 | 439/747 |
| 4,332,431 | A * | 6/1982 | Bobb | H01R 12/88 | 439/267 |
| 6,280,216 | B1 * | 8/2001 | Bernier | H02B 11/12 | 439/857 |

(Continued)

FOREIGN PATENT DOCUMENTS

WO WO8607204 A1 * 12/1986 ............. H01R 23/72

*Primary Examiner* — Gary F Paumen
(74) *Attorney, Agent, or Firm* — Barley Snyder

(57) ABSTRACT

A connector comprises a housing defining a terminal accommodating portion a supporting block. The connector further includes a pair of terminal assemblies mounted in the terminal accommodating portion and arranged to be spaced apart from each other. Each terminal assembly of the pair of terminal assemblies has a plate-shaped fixing portion extending in a first direction, and a terminal portion extending from the plate-shaped fixing portion in a second direction perpendicular to the first direction. Each terminal assembly further includes an elastic supporting arm extending from a lower end of the terminal portion adjacent to the plate-shaped fixing portion in a direction inclined to both the first direction and the second direction. The elastic supporting arms of the pair of terminal assemblies abutted against the supporting block.

20 Claims, 8 Drawing Sheets

(56) References Cited

U.S. PATENT DOCUMENTS

| | | | | |
|---|---|---|---|---|
| 6,645,012 | B2 * | 11/2003 | Ito | H01R 12/721 439/862 |
| 7,798,860 | B2 * | 9/2010 | Yuan | H01R 12/721 439/637 |

* cited by examiner

ELECTRONIC CONNECTOR

CROSS-REFERENCE TO RELATED APPLICATIONS

This application claims the priority benefit of Chinese Patent Application No. 202111018654.3 filed on Aug. 31, 2021 in the China National Intellectual Property Administration, the whole disclosure of which is incorporated herein by reference.

FIELD OF THE INVENTION

The present disclosure relates to electrical connectors, and more specifically, to an electrical connector for a bus bar.

BACKGROUND

There are misalignment mating and tilting mating issues in mating conditions between a power supply unit (PSU) or battery backup unit (BBU) and a power shelf bus bar of an existing data center. In order to achieve a low insertion force requirement of an existing power connector in the conventional alignment mating condition, an elastic terminal of the connector is usually designed to have a smaller elasticity value to meet the low insertion force requirement. In practice, a risk of contact is inevitable (for example, one side of the elastic terminal is subjected to a larger force, while the other side of the elastic terminal is subjected to a smaller force, or even no contact) when the existing power connectors are in misalignment, and the risk of contact will inevitably exist especially in the extreme misalignment mating condition, which will affect the product performance of the connector (for example, insertion force, contact resistance, current capability), resulting in high contact resistance and unstable contact resistance of the connector, which reduces the current carrying capability of the connector in misalignment mating condition.

SUMMARY

According to one embodiment of the present disclosure, a connector comprises a housing defining a terminal accommodating portion and a supporting block. The connector further includes a pair of terminal assemblies mounted in the terminal accommodating portion and arranged to be spaced apart from each other. Each terminal assembly of the pair of terminal assemblies has a plate-shaped fixing portion extending in a first direction, and a terminal portion extending from the plate-shaped fixing portion in a second direction perpendicular to the first direction. Each terminal assembly further includes an elastic supporting arm extending from a lower end of the terminal portion adjacent to the plate-shaped fixing portion in a direction inclined to both the first direction and the second direction. The elastic supporting arms of the pair of terminal assemblies abutted against the supporting block.

BRIEF DESCRIPTION OF THE DRAWINGS

The invention will now be described by way of example with reference to the accompanying Figures, of which.

DETAILED DESCRIPTION OF THE EMBODIMENTS

Figure 1:
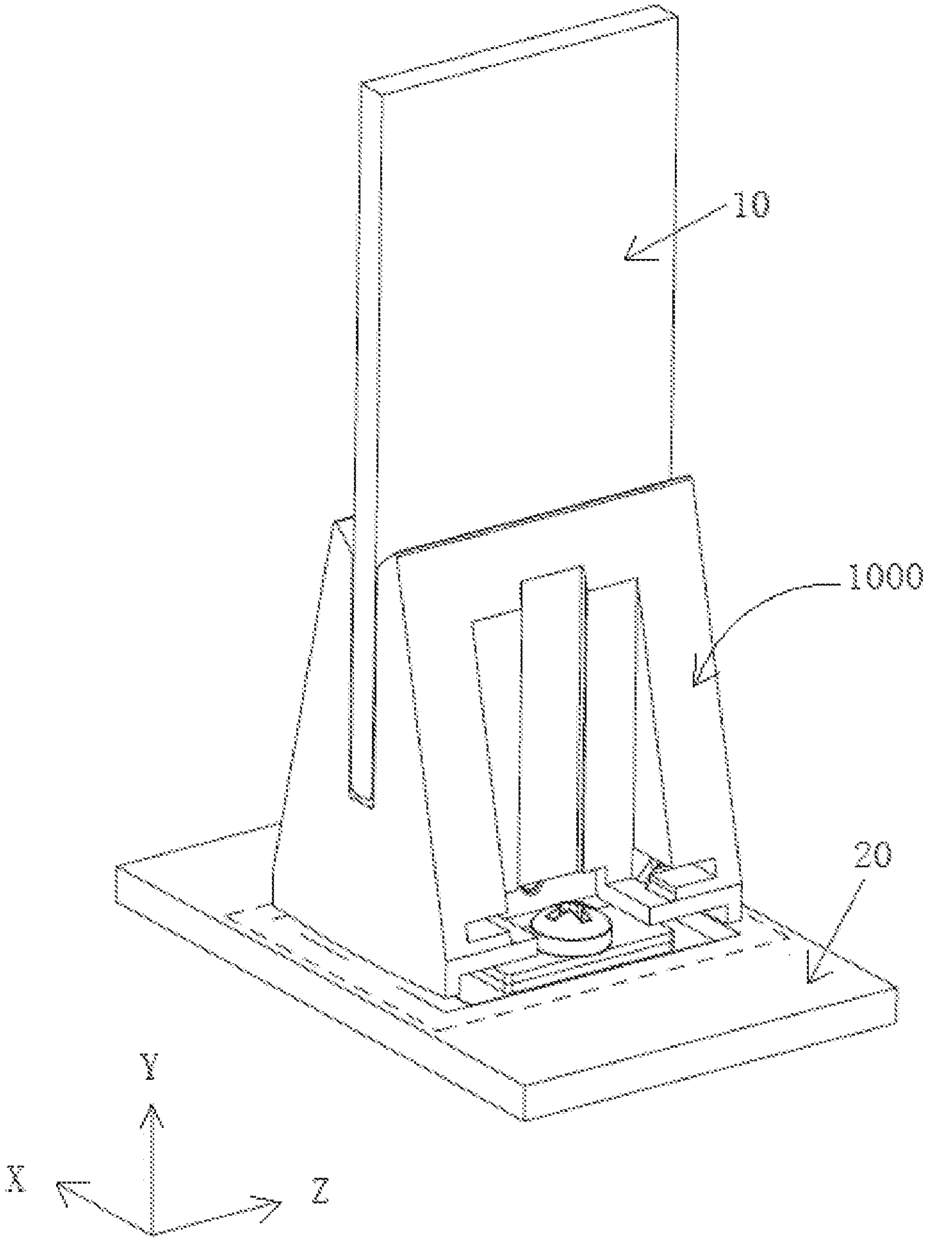
FIG. 1 shows a schematic diagram of a connector according to an exemplary embodiment of the present disclosure in a connection state, wherein the connector connects a bottom bus bar and a mating bus bar.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one general technical concept of the present disclosure, there is provided a connector including a housing and a pair of terminal assemblies. Each terminal assembly of the pair of terminal assemblies has a plate-shaped fixing portion extending in a first direction, a terminal portion extending from the plate-shaped fixing portion in a second direction perpendicular to the first direction, and an elastic supporting arm extending from a lower end of the terminal portion adjacent to the plate-shaped fixing portion in a direction inclined to the first direction and the second direction. The pair of terminal assemblies are mounted in the terminal accommodating portion of the housing and arranged to be spaced apart from each other. A supporting block is formed in the housing, and the elastic supporting arms of the pair of terminal assemblies are abutted against the corresponding supporting block, respectively.

Figure 2:
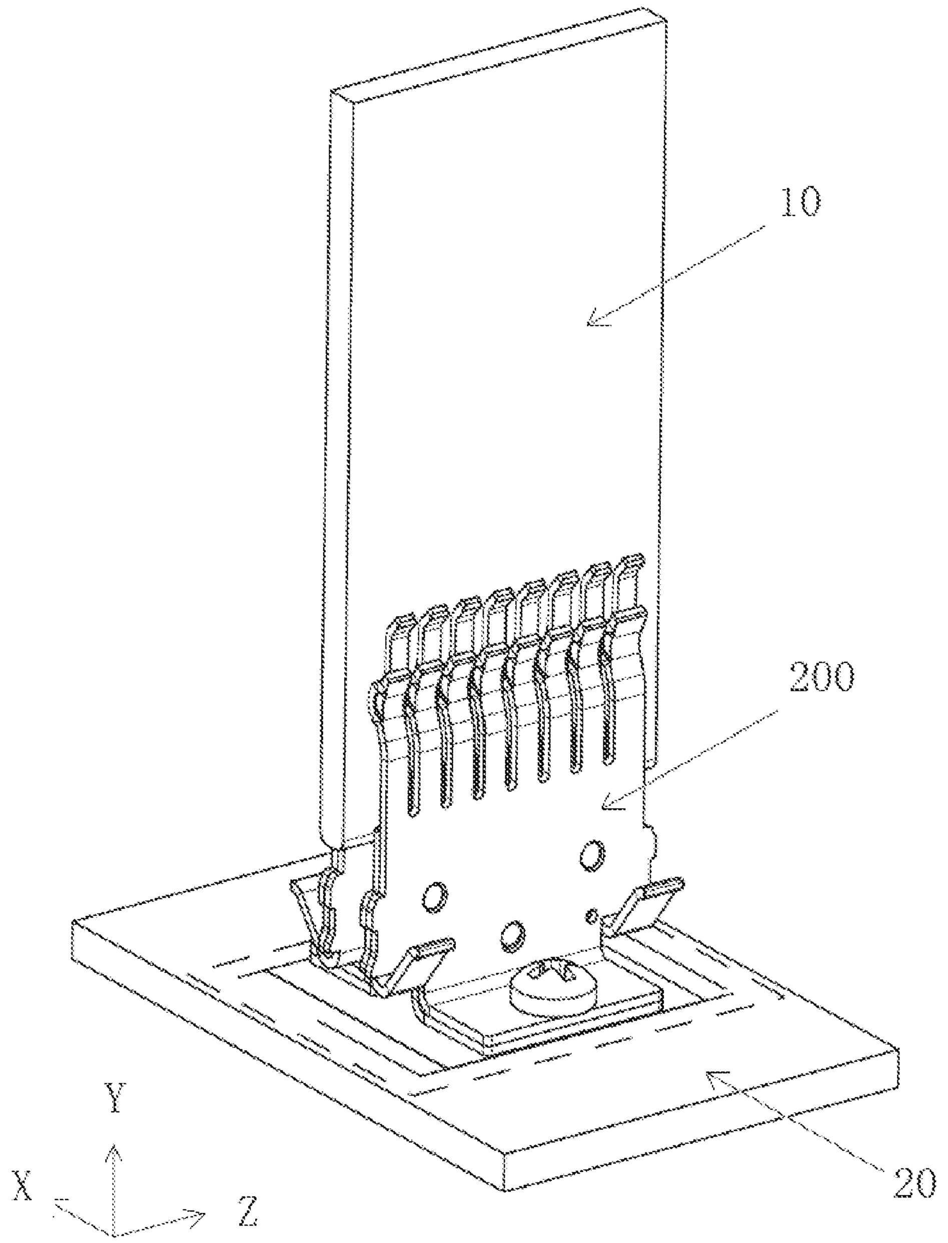
FIG. 2 shows a schematic diagram of a pair of terminal assemblies of the connector shown in FIG. 1 in the connection state, wherein the pair of terminal assemblies are electrically connected to the bottom bus bar and the mating bus bar.

FIG. 1 shows a schematic diagram of a connector 1000 according to an exemplary embodiment of the present disclosure in a connection state, wherein the connector 1000 connects a bottom bus bar 20 and a mating bus bar 10. FIG. 2 shows a schematic diagram of a pair of terminal assemblies 200 of the connector 1000 shown in FIG. 1 in the connection state, wherein the pair of terminal assemblies 200 are electrically connected to the bottom bus bar 20 and the mating bus bar 10. That is to say, the housing of the connector 1000 is omitted in FIG. 2, the plate-shaped fixing portion of the pair of terminal assemblies 200 is configured to be electrically connected to the bottom bus bar 20 in a fastening manner, and the terminal portion of the pair of terminal assemblies 200 is configured to be electrically connected to the mating bus bar 10 in a plug-in manner. In actual use, a plurality of connectors 1000 provided by the present disclosure are arranged side by side to connect the bottom bus bar 20 and the mating bus bar 10.

Figure 3:
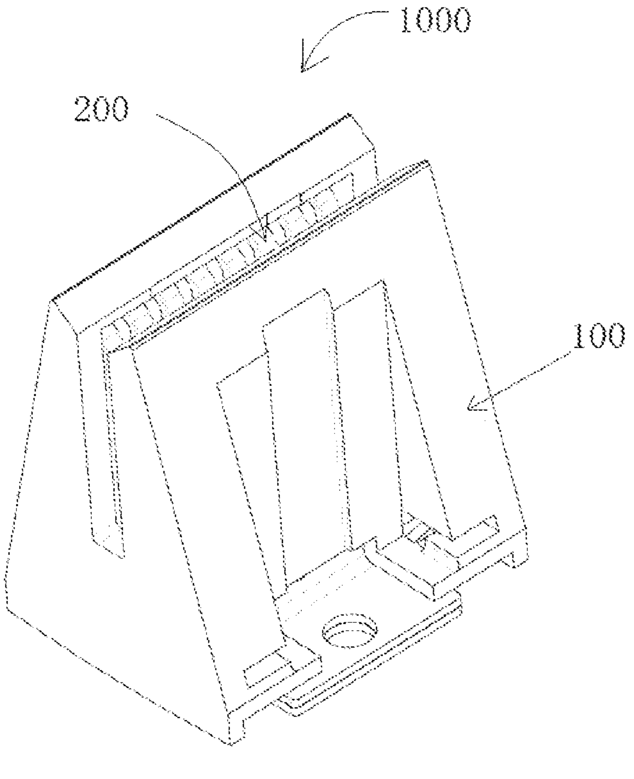
FIG. 3 shows a schematic perspective view of the connector according to the exemplary embodiment of the present disclosure.
Figure 4:
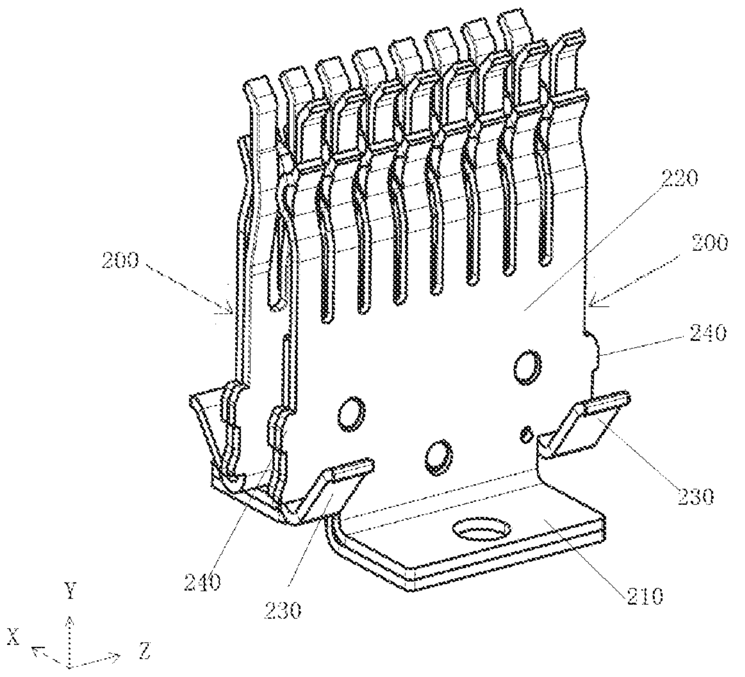
FIGS. 4 and 5 show a schematic perspective view and a schematic side view of the pair of terminal assemblies of the connector according to the exemplary embodiment of the present disclosure, respectively.
Figure 5:
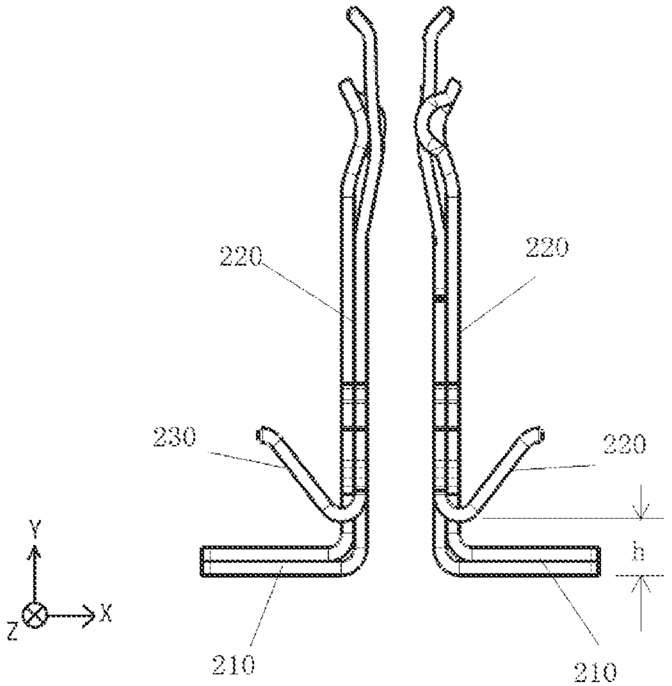
Figure 6:
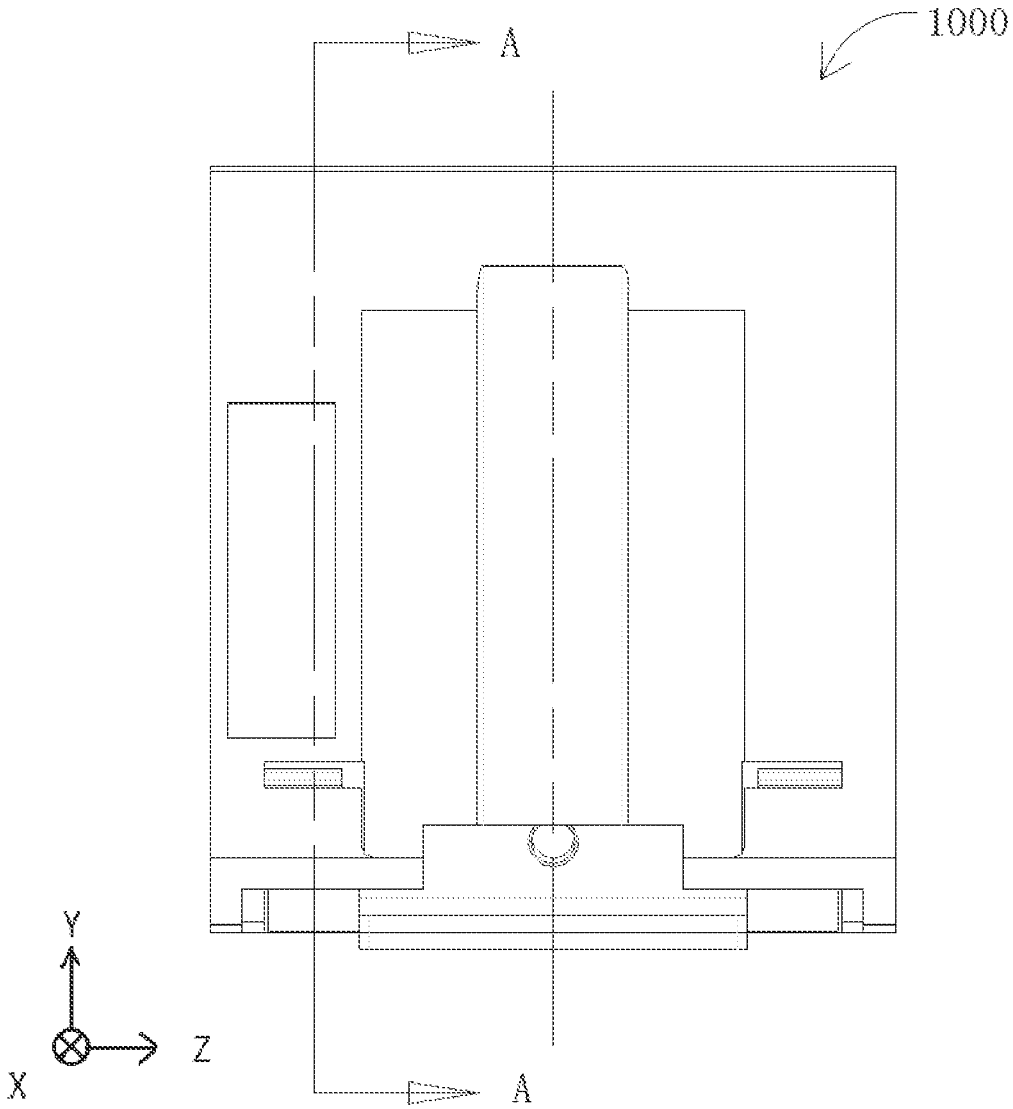
FIG. 6 shows a schematic front view of the connector according to the exemplary embodiment of the present disclosure.
Figure 7:
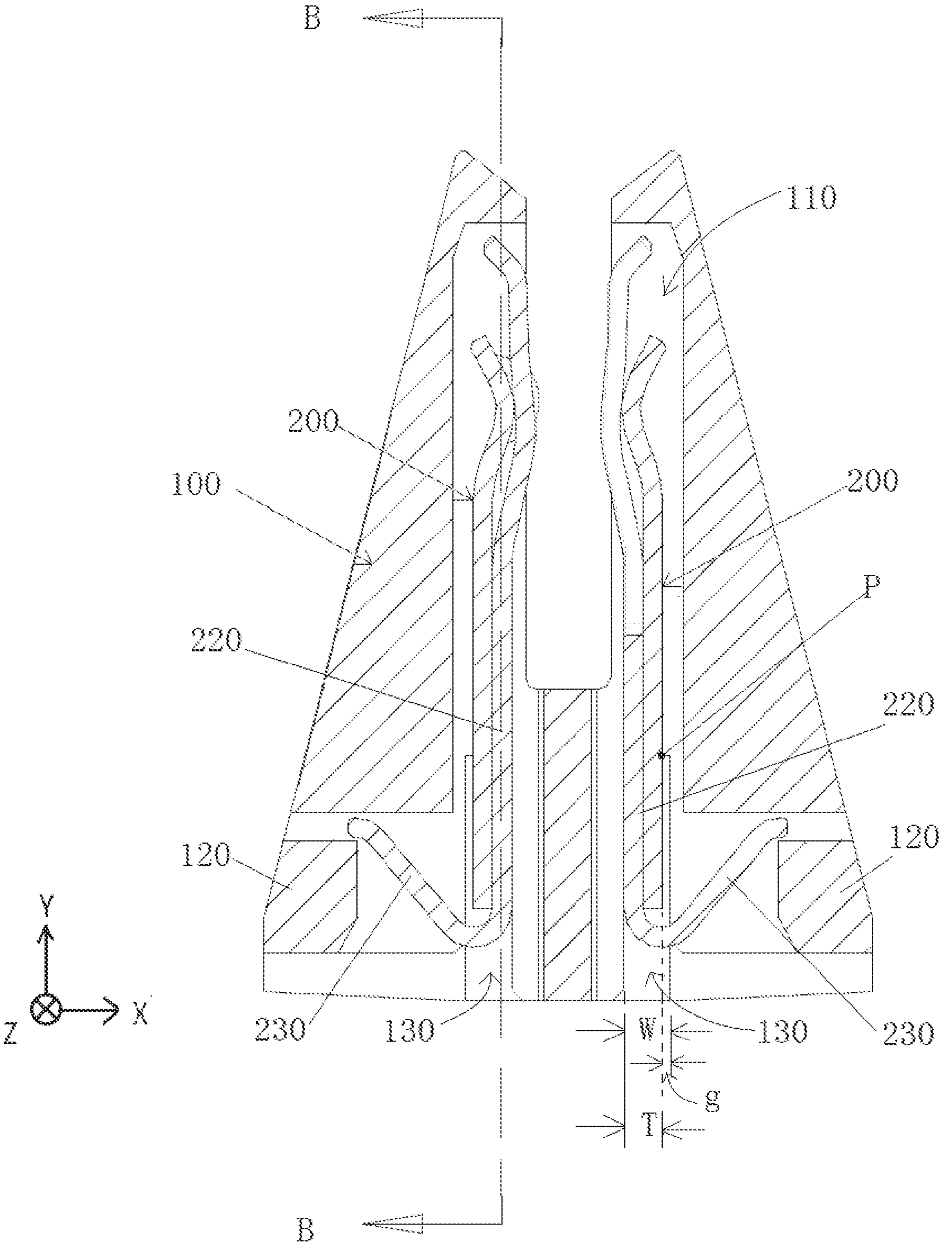
FIG. 7 shows a schematic cross-sectional view of the connector shown in FIG. 6 taken along line A-A.
Figure 8:
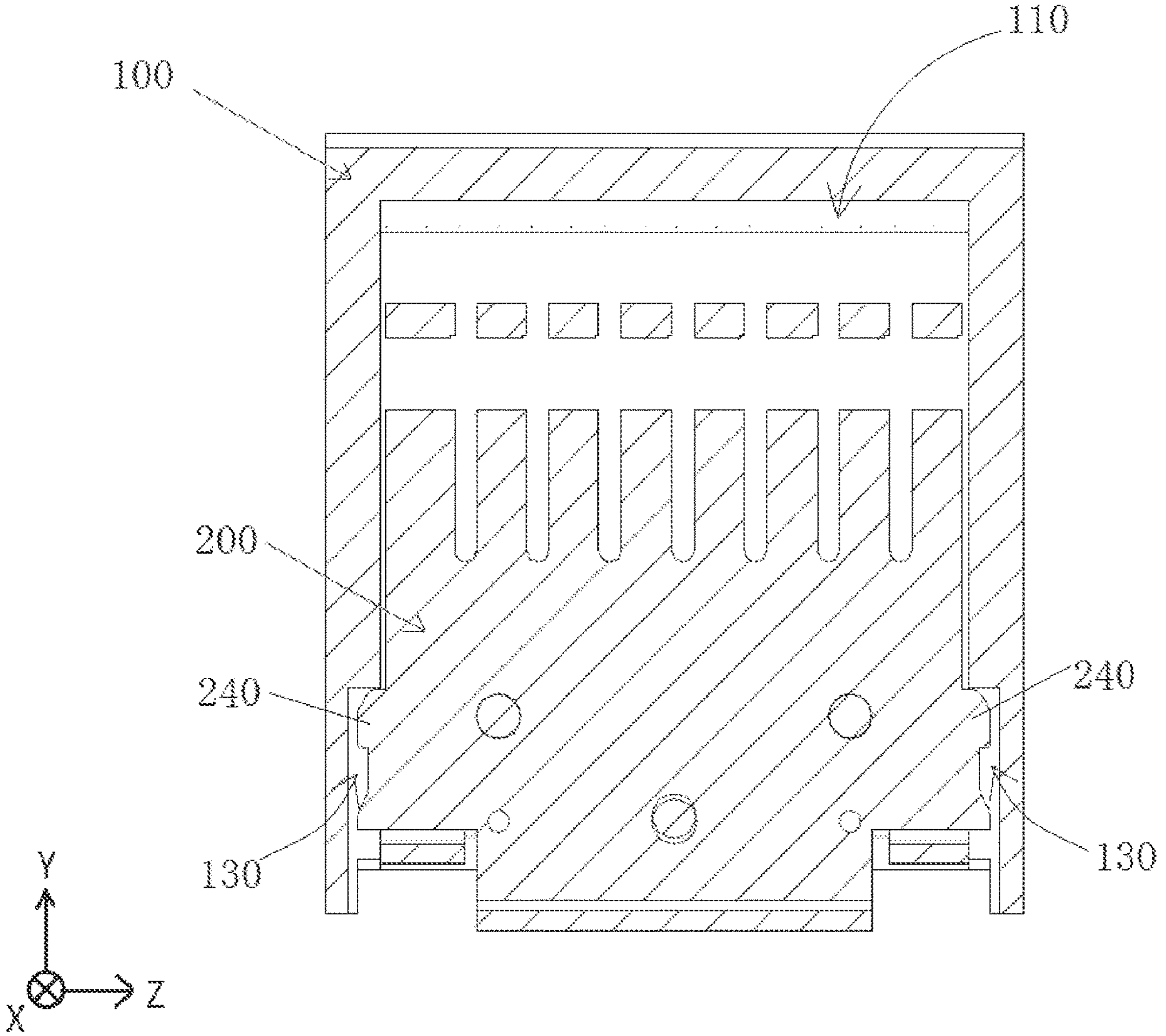
FIG. 8 shows a cross-sectional schematic view of the connector shown in FIG. 7 taken along line B-B.

FIG. 3 shows a schematic perspective view of the connector according to the exemplary embodiment of the present disclosure; FIGS. 4 and 5 show a schematic perspective view and a schematic side view of the pair of terminal assemblies of the connector according to the exemplary embodiment of the present disclosure, respectively; FIG. 6 shows a schematic front view of the connector according to the exemplary embodiment of the present disclosure; FIG. 7 shows a schematic cross-sectional view of the connector shown in FIG. 6 taken along line A-A; and FIG. 8 shows a cross-sectional schematic view of the connector shown in FIG. 7 taken along line B-B.

In the illustrated exemplary embodiment, as shown in FIGS. 1 to 8, the connector 1000 includes a housing 100 and a pair of terminal assemblies 200 provided in the housing 100. The housing 100 has a terminal accommodating portion 110, the pair of terminal assemblies 200 are mounted in the terminal accommodating portion 110 of the housing 100 and arranged to be spaced apart from each other. Each terminal assembly 200 of the pair of terminal assemblies 200 has a plate-shaped fixing portion 210 extending in a first direction X, a terminal portion 220 extending from the plate-shaped fixing portion 210 in a second direction Y perpendicular to the first direction X, and an elastic supporting arm 230 extending from a lower end of the terminal portion 220 adjacent to the plate-shaped fixing portion 210 in a direction inclined to both the first direction X and the second direction Y. In some embodiments, two terminal assemblies 200 of the pair of terminal assemblies 200 are disposed spaced apart from each other and in a mirror-image relationship to each other for the mating bus bar to be inserted and electrically connected between the two terminal assemblies 200. According to the present disclosure, as shown in FIG. 7, a supporting block 120 is formed in the housing 100 (in the terminal accommodating portion 110 of the housing 100 in the illustrated embodiment, but not limited to this), and the elastic supporting arm of the pair of terminal assemblies 200 is abutted against the corresponding supporting block 120, respectively. According to the connector of the present disclosure, the problem of insufficient reliable contacting performance of the terminal assembly of the connector in misalignment mating and tilting floating mating conditions is solved by adopting a supporting structure between the elastic supporting arm 230 and the supporting block 120 as described above, in this way, low insertion force and easy insertion, lower and more stable contact resistance, and higher current carrying capacity are achieved either in conventional alignment mating condition or in extreme misalignment mating condition. In addition, according to the connector of the present disclosure, the terminal can be made of cheap copper material with ordinary stress relaxation performance (for example, C19210 copper) by adopting the abovementioned mating structure of the terminal assembly and the housing as described above (including the supporting structure between the elastic supporting arm 230 and the supporting block 120 as described above), thereby saving costs.

It should be noted that, according to the connector of the present disclosure, based on practical requirements, the supporting structure between the elastic supporting arm and the supporting block as described above may be designed to provide support for the terminal assembly only in the misalignment mating condition, and may also be designed to provide support for the terminal assembly either in the conventional alignment mating condition or in extreme misalignment mating condition.

Specifically, in the illustrated exemplary embodiment, as shown in FIGS. 1 to 8, in each terminal assembly 200 of the pair of terminal assemblies 200, the elastic supporting arm 230 is formed on two opposite outermost sides of the plate-shaped fixing portion 210 in a third direction Z perpendicular to both the first direction X and the second direction Y. Based on the above configuration, not only original design of the terminal assembly can be maintained to the maximum extent, but also the balanced performance of the terminal assembly can be maintained.

Specifically, in the illustrated exemplary embodiment, as shown in FIGS. 1 to 8, in each terminal assembly 200 of the pair of terminal assemblies 200, the elastic supporting arm 230 extends from the terminal portion 220 at a distance from a connection between the terminal portion 220 and the plate-shaped fixing portion 210. More Specifically, as shown in FIG. 5, the elastic supporting arm 230 extends from the terminal portion 220 at the distance h from the connection between the terminal portion 220 and the plate-shaped fixing portion 210, that is to say, in the direction Y, the position where the elastic supporting arm 230 is bent and extends from the terminal portion 220 may be higher than the position where the plate-shaped fixing portion 210 is bent and extends from the terminal part 220.

Figure 4A:
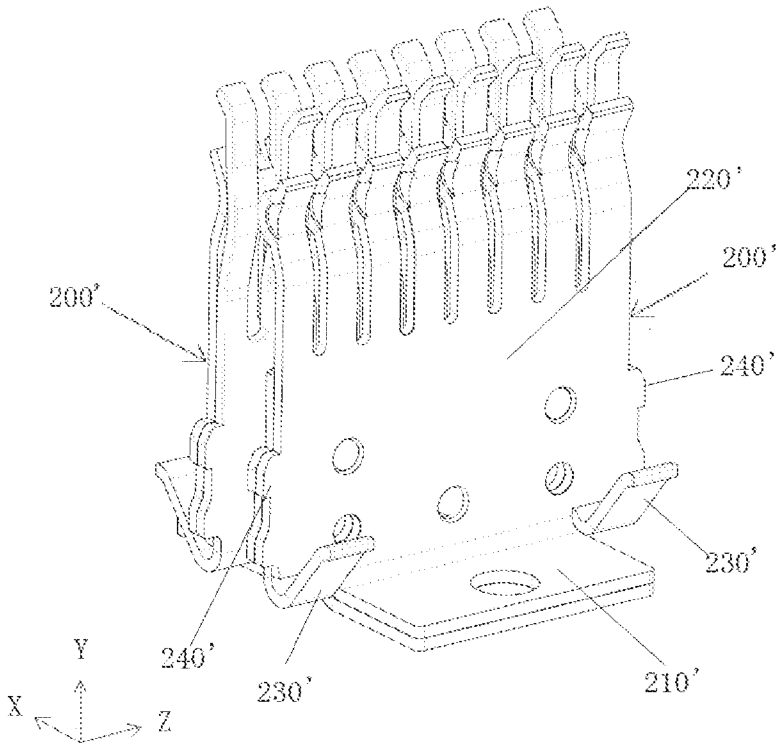
FIGS. 4A and 5A show a schematic perspective view and a schematic side view of a pair of terminal assemblies of a connector according to an alternative embodiment of the present disclosure, respectively.
Figure 5A:
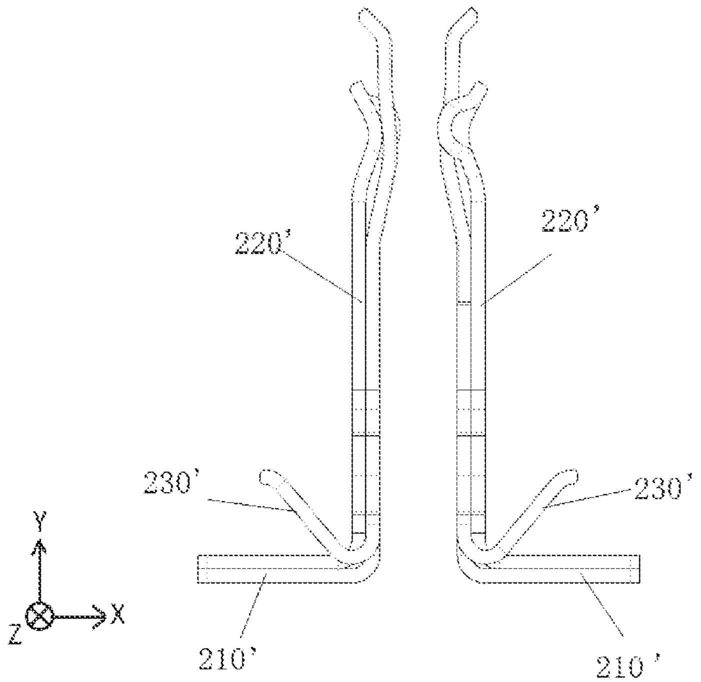

Optionally, FIGS. 4A and 5A show a perspective view and a side view of the pair of terminal assemblies of the connector according to an alternative embodiment of the present disclosure, respectively. In the alternative embodiment shown in FIGS. 4A and 5A, in each terminal assembly 200' of the pair of terminal assemblies 200', the elastic supporting arm 230' may also extend directly from the terminal portion 220' at the connection between the terminal portion 220' and the plate-shaped fixing portion 210'. More specifically, as shown in FIG. 5A, the position where the elastic supporting arm 230' is bent and extends from the terminal portion 220' is the position where the plate-shaped fixing portion 210' is bent and extends from the terminal portion 220, and there is no distance difference therebetween, the only difference is that the elastic supporting arms 230' are bent and extends from the terminal portion 220' at two opposite outermost sides of the plate-shaped fixing portion 210 in the third direction Z.

Specifically, in the illustrated exemplary embodiment, as shown in FIGS. 1 to 8, in each terminal assembly 200 of the pair of terminal assemblies 200, the terminal portion 220 further includes a waist portion 240 provided at a middle and lower portion of the terminal portion 220, the waist portion 240 being formed by extending outwards from two opposite outermost sides of the terminal portion 220 in a third direction Z perpendicular to both the first direction X and the second direction Y, respectively. Meanwhile, the terminal accommodating portion 110 of the housing 100 is further formed with a receiving groove 130 for receiving the waist portion 240, at a position corresponding to the waist portion 240 of the terminal portion 220. That is to say, the assembling of the terminal assembly 200 in the housing 100 is achieved by receiving the waist portion 240 of the terminal assembly 200 in the receiving groove 130 of the terminal accommodating portion 110 of the housing 100.

According to the connector of the present invention, as shown in FIGS. 1 to 8, especially as shown in FIG. 7, in the illustrated exemplary embodiment, a width W of the receiving groove 130 in the first direction X is larger than a thickness T of the waist portion 240 in the first direction X. In other words, there is a gap g between the waist portion 240 and the receiving groove 130 in the first direction X. More specifically, the gap g is located on a side of one terminal assembly to which the waist portion 240 belongs away from the other terminal assembly. That is to say, the waist portion 240 of the terminal assembly 200 and the receiving groove 130 of the housing 100 are not fixedly assembled, but there is a certain redundant space. Based on the above configuration, in the misalignment mating condition, such as in the misalignment (tilting to right) mating condition in the structure as shown in FIG. 7, the waist portion 240 of the terminal assembly 200 interferes with a top end of the receiving groove 130 of the housing 100, thus forming a force supporting point P, and a deformable length of the elastic arm in the terminal portion 220 is changed by the support function here; at the same time, in the misalignment mating condition, the supporting structure between the elastic supporting arm 230 of the terminal assembly 200 and the supporting block 120 of the housing 100 as described above also provides an elastic force for the terminal assembly. In this way, both the interference of the terminal elastic arm in the terminal portion 220 with the top end of the receiving groove 130 of the housing 100 and the interference of the elastic supporting arm 230 with the supporting block 120 of the housing 100 as described above provide a contact positive force for the terminal assembly in the misalignment mating condition, thereby achieving reliable contact between the bus bar and the terminal assembly.

In this way, according to the connector of the present disclosure, the plate-shaped fixing portion 210 of the pair of terminal assemblies 200 is configured to be electrically connected to the bottom bus bar 20 in a fastening manner, whereas the terminal portion 220 is configured to be electrically connected the mating bus 10 in a plug-in manner, as a result, low insertion force and easy insertion, lower and more stable contact resistance, and higher current carrying capacity at the same time with reliable contact are achieved whether the plug-in mating between the mating bus bar 10 and the terminal portion 220 is in conventional alignment mating condition or in extreme misalignment mating condition.

Specifically, in the illustrated exemplary embodiment, as shown in FIGS. 1 to 8, the plate-shaped fixing portion, the terminal portion, the elastic supporting arm and the waist portion in each of the terminal assemblies may be integrally formed. In this way, as described above, the terminals can be made of copper with ordinary stress relief properties but lower cost (for example, C19210 copper), thus saving costs.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector comprising:

a housing defining a terminal accommodating portion and a supporting block; and a pair of terminal assemblies mounted in the terminal accommodating portion and arranged spaced apart from each other, each terminal assembly of the pair of terminal assemblies having:

a plate-shaped fixing portion extending in a first direction;

a terminal portion extending from the plate-shaped fixing portion in a second direction perpendicular to the first direction; and an elastic supporting arm extending from a lower end of the terminal portion adjacent to the plate-shaped fixing portion in a direction inclined to both the first direction and the second direction, the elastic supporting arms of the pair of terminal assemblies abutted against the supporting block, the elastic supporting arm is formed on two opposite outermost sides of the plate-shaped fixing portion in a third direction perpendicular to both the first direction and the second direction.

2. The connector according to claim 1, wherein in each terminal assembly, the elastic supporting arm extends from the terminal portion at a connection between the terminal portion and the plate-shaped fixing portion.

3. The connector according to claim 1, wherein in each terminal assembly, the elastic supporting arm extends from the terminal portion at a non-zero distance from a connection between the terminal portion and the plate-shaped fixing portion.

4. The connector according to claim 1, wherein in each terminal assembly, the terminal portion further includes a waist portion formed at a middle and lower portion of the terminal portion, the waist portion extending outward from two opposite outermost sides of the terminal portion in a third direction perpendicular to both the first direction and the second direction, respectively.

5. The connector according to claim 4, wherein the terminal accommodating portion of the housing defines a receiving groove receiving the waist portion.

6. The connector according to claim 5, wherein a width of the receiving groove in the first direction is greater than a thickness of the waist portion in the first direction.

7. The connector according to claim 5, wherein a gap is defined between the waist portion and the receiving groove in the first direction, the gap is located on a side of one terminal assembly to which the waist portion belongs away from the other terminal assembly.

8. The connector according to claim 4, wherein the plate-shaped fixing portion, the terminal portion, the elastic supporting arm and the waist portion are integrally formed.

9. The connector according to claim 1, wherein the plate-shaped fixing portions of the pair of terminal assemblies are electrically connected to a bottom bus bar via a fastener, and the terminal portions of the pair of terminal assemblies are electrically connected to a mating bus bar received between the terminal portions.

10. A connector comprising:

a housing defining a terminal accommodation space;

first and second terminal assemblies mounted in the terminal accommodation space and positioned to accept a bus bar inserted therebetween, each terminal assembly including:

a plate-shaped fixing portion extending in a first direction;

a terminal connecting portion adapted to electrically connect to the bus bar; and an elastic supporting arm extending obliquely from the terminal connecting portion and supported by the housing, the elastic supporting arm is formed on two opposite outermost sides of the plate-shaped fixing portion.

11. The connector of claim 10, wherein the terminal connecting portion extends from the plate-shaped fixing portion in a second direction distinct from the first direction, and the elastic supporting arm extends from a lower end of the terminal connecting portion adjacent to the plate-shaped fixing portion in a direction inclined to both the first direction and the second direction.

12. The connector according to claim 10, wherein the housing further defines a supporting block supporting the elastic supporting arms of the pair of terminal assemblies.

13. The connector according to claim 11, wherein the first direction is perpendicular to the second direction.

14. The connector according to claim 11, wherein the elastic supporting arm is formed in a third direction perpendicular to both the first direction and the second direction.

15. The connector according to claim 10, wherein the terminal portion further includes a waist portion formed at a middle portion of the terminal portion and extending outward from two opposite outermost sides of the terminal portion in a third direction perpendicular to both the first direction and a second direction, respectively.

16. The connector according to claim 15, wherein the terminal accommodation space of the housing defines a receiving groove receiving the waist portion.

17. The connector according to claim 16, wherein a gap is defined between the waist portion and the receiving groove in the first direction.

18. The connector according to claim 16, wherein a width of the receiving groove in the first direction is greater than a thickness of the waist portion in the first direction.

19. A connector comprising:

a housing defining a terminal accommodating portion and a supporting block; and a pair of terminal assemblies mounted in the terminal accommodating portion and arranged spaced apart from each other, each terminal assembly of the pair of terminal assemblies having:

a plate-shaped fixing portion extending in a first direction;

a terminal portion extending from the plate-shaped fixing portion in a second direction perpendicular to the first direction; and an elastic supporting arm extending from a lower end of the terminal portion adjacent to the plate-shaped fixing portion in a direction inclined to both the first direction and the second direction, the elastic supporting arms of the pair of terminal assemblies abutted against the supporting block, the elastic supporting arm extends from the terminal portion at a connection between the terminal portion and the plate-shaped fixing portion.

20. A connector comprising:

a housing defining a terminal accommodating portion and a supporting block; and a pair of terminal assemblies mounted in the terminal accommodating portion and arranged spaced apart from each other, each terminal assembly of the pair of terminal assemblies having:

a plate-shaped fixing portion extending in a first direction;

a terminal portion extending from the plate-shaped fixing portion in a second direction perpendicular to the first direction, the terminal portion includes a waist portion formed at a middle and lower portion of the terminal portion, the waist portion extending outward from two opposite outermost sides of the terminal portion in a third direction perpendicular to both the first direction and the second direction, respectively, the terminal accommodating portion of the housing defines a receiving groove receiving the waist portion, a gap is defined between the waist portion and the receiving groove in the first direction, the gap is located on a side of one terminal assembly to which the waist portion belongs away from the other terminal assembly; and an elastic supporting arm extending from a lower end of the terminal portion adjacent to the plate-shaped fixing portion in a direction inclined to both the first direction and the second direction, the elastic supporting arms of the pair of terminal assemblies abutted against the supporting block.

* * * * *